(12) United States Patent
Scoville et al.

(10) Patent No.: US 11,001,473 B2
(45) Date of Patent: May 11, 2021

(54) TRAFFIC ANALYSIS SYSTEM AND METHOD

(71) Applicant: OTIS ELEVATOR COMPANY, Farmington, CT (US)

(72) Inventors: Bradley Armand Scoville, Farmington, CT (US); Eric C. Peterson, East Longmeadow, MA (US)

(73) Assignee: Otis Elevator Company, Farmington, CT (US)

( * ) Notice: Subject to any disclaimer, the term of this patent is extended or adjusted under 35 U.S.C. 154(b) by 501 days.

(21) Appl. No.: 15/422,686

(22) Filed: Feb. 2, 2017

(65) Prior Publication Data

US 2017/0233220 A1   Aug. 17, 2017

Related U.S. Application Data

(60) Provisional application No. 62/293,904, filed on Feb. 11, 2016.

(51) Int. Cl.
| | |
|---|---|
| *B66B 5/00* | (2006.01) |
| *G06Q 10/06* | (2012.01) |
| *G06Q 10/04* | (2012.01) |
| *G06Q 30/02* | (2012.01) |
| *B66B 1/34* | (2006.01) |

(52) U.S. Cl.
CPC .......... *B66B 5/0012* (2013.01); *B66B 5/0018* (2013.01); *B66B 5/0037* (2013.01); *G06Q 10/04* (2013.01); *G06Q 10/06* (2013.01); *G06Q 10/0631* (2013.01); *G06Q 30/0201* (2013.01); *B66B 1/3476* (2013.01); *B66B 1/3492* (2013.01)

(58) Field of Classification Search
CPC combination set(s) only.
See application file for complete search history.

(56) References Cited

U.S. PATENT DOCUMENTS

| | | | |
|---|---|---|---|
| 4,044,680 A | 8/1977 | Kaneko et al. | |
| 4,874,063 A | 10/1989 | Taylor | |
| 6,697,104 B1 | 2/2004 | Yakobi et al. | |

(Continued)

FOREIGN PATENT DOCUMENTS

| | | | |
|---|---|---|---|
| CN | 104828664 | 8/2015 | |
| CN | 104828664 A | * 8/2015 | ............... B66B 3/02 |

(Continued)

OTHER PUBLICATIONS

Translation of foreign application publication CN-104828664-A (Year: 2015).*

(Continued)

*Primary Examiner* — Jerry O'Connor
*Assistant Examiner* — Michael R Koester
(74) *Attorney, Agent, or Firm* — Bachman & LaPointe, P.C.

(57) ABSTRACT

A self-contained data acquisition system for a passenger conveyance system, includes a sensor module for sensing data associated with an entry and exit of each of a multiple of passengers, a location sensor module for sensing a position of the passenger conveyance upon entry and exit of each of the multiple of respective passengers and a processing module operable to use the sensed data from the sensor module and the location sensor module to record passenger data.

8 Claims, 4 Drawing Sheets

(56) References Cited

U.S. PATENT DOCUMENTS

| | | | |
|---|---|---|---|
| 7,140,469 | B2 | 11/2006 | Deplazes et al. |
| 7,823,701 | B2* | 11/2010 | Roussel ................. B66B 1/34 187/392 |
| 7,857,105 | B2 | 12/2010 | Roydhouse |
| 8,020,672 | B2 | 9/2011 | Lin et al. |
| 8,660,700 | B2 | 2/2014 | Jia et al. |
| 2006/0037818 | A1 | 2/2006 | Deplazes et al. |
| 2007/0098253 | A1 | 5/2007 | Crespi et al. |
| 2007/0170037 | A1 | 7/2007 | Kuroda |
| 2012/0020518 | A1* | 1/2012 | Taguchi ................. G06T 7/292 382/103 |
| 2015/0068850 | A1* | 3/2015 | Mattsson .............. B66B 1/3492 187/392 |
| 2015/0073748 | A1 | 3/2015 | Mattsson et al. |
| 2015/0096843 | A1 | 4/2015 | Siddiqui et al. |
| 2015/0284214 | A1* | 10/2015 | Park ..................... B66B 5/0037 187/393 |
| 2016/0295196 | A1 | 10/2016 | Finn et al. |

FOREIGN PATENT DOCUMENTS

| | | |
|---|---|---|
| EP | 1313321 A1 | 5/2003 |
| EP | 1345445 A1 | 9/2003 |
| EP | 2295361 A1 | 3/2011 |
| KR | 20110117529 A | 10/2011 |
| WO | 2009126140 | 10/2009 |
| WO | 2013130040 | 9/2013 |
| WO | 2015023278 | 2/2015 |

OTHER PUBLICATIONS

English Translation of CN-104828664-A (Year: 2015).*
European Search Report dated Mar. 30, 2017 for Application No. 17155926.3.
Real-Time People Counting system using Video Camera, Damien Lefloch, Master of Computer Science, Image and Artificial Intelligence 2007.

* cited by examiner

US 11,001,473 B2

TRAFFIC ANALYSIS SYSTEM AND METHOD

CROSS REFERENCE TO RELATED APPLICATION

This application claims the benefit of provisional application Ser. No. 62/293,904, filed Feb. 11, 2016.

BACKGROUND

The present disclosure relates to a passenger conveyance and, more particularly, to elevator installation.

Installation of elevator systems may incur considerable expense and inconvenience in labor needed, time, test fixtures, measurement devices, and data entry.

Over-elevatoring (including too much elevator capacity) incurs ongoing lost revenue opportunity, to building owners, while correcting mistakes in building design, e.g. under-elevatoring (including too little elevator capacity), is exceedingly difficult. This demands conservative elevator design, based largely on statistical models which may be informed by analysis.

Current elevator reporting tools cannot capture the volume and destination of people moving through a building. Multiple people are hired on demand to ride in elevators and record how many people enter and exit at each floor. Data is later compiled to generate a passenger list. This passenger list is used to extract various metrics. Such data collection, although effective, may be time consuming, expensive and may be particularly subject to human error.

SUMMARY

A data acquisition system for a passenger conveyance system according to one disclosed non-limiting embodiment of the present disclosure can include a sensor module for sensing data associated with an entry and exit of each of a multiple of passengers; a location sensor module for sensing a position of the passenger conveyance upon entry and exit of each of the multiple of respective passengers; and a processing module in communication with the sensor module and the location sensor module, the processing module operable to use the sensed data from the sensor module and the location sensor module to generate passenger data.

A further embodiment of any of the embodiments of the present disclosure may include, wherein the processing module is in communication with a control system of the passenger conveyance system.

A further embodiment of any of the embodiments of the present disclosure may include, wherein the passenger data includes a current floor, the current floor is associated with at least one of an exit of a passenger and an entry of a passenger.

A further embodiment of any of the embodiments of the present disclosure may include, wherein the passenger data includes a door state of the elevator car.

A further embodiment of any of the embodiments of the present disclosure may include, wherein the passenger data includes a floor of the elevator car.

A further embodiment of any of the embodiments of the present disclosure may include, wherein the passenger data includes a time at each floor at which an exit or entrance occurs.

A further embodiment of any of the embodiments of the present disclosure may include, wherein the sensor module includes a depth-sensing sensor.

A further embodiment of any of the embodiments of the present disclosure may include, wherein the sensor module includes a video sensor.

A further embodiment of any of the embodiments of the present disclosure may include, wherein the sensor module is operable to view a car operating panel.

A further embodiment of any of the embodiments of the present disclosure may include, wherein the sensor module is operable to view an elevator door.

A further embodiment of any of the embodiments of the present disclosure may include, a power supply to power the data acquisition system such that the data acquisition system is self-contained.

A further embodiment of any of the embodiments of the present disclosure may include, wherein the data acquisition system is time synced with a second data acquisition system.

A further embodiment of any of the embodiments of the present disclosure may include, a memory operable to locally store the passenger data.

A further embodiment of any of the embodiments of the present disclosure may include, a memory operable to locally store a passenger manifest generated by the processing module from the passenger data.

A method of passenger traffic analysis for a passenger conveyance system with a self-contained data acquisition system according to one disclosed non-limiting embodiment of the present disclosure can include sensing data associated with an entry and exit of each of a multiple of passengers to the passenger conveyance; sensing data associated with a position of the passenger conveyance upon entry and exit of each of the multiple of respective passengers; and using the data from the sensor module and the location sensor module to generate passenger data associated with a passenger manifest.

A further embodiment of any of the embodiments of the present disclosure may include, wherein sensing data associated with an entry and exit of each of a multiple of passengers to the passenger conveyance includes video tracking.

A further embodiment of any of the embodiments of the present disclosure may include, wherein sensing data associated with an entry and exit of each of a multiple of passengers to the passenger conveyance includes depth sensing.

A further embodiment of any of the embodiments of the present disclosure may include, wherein sensing the position of the passenger conveyance upon entry and exit of each of the multiple of respective passengers includes sensing a button selection on a car operating panel.

A further embodiment of any of the embodiments of the present disclosure may include, wherein sensing the position of the passenger conveyance upon entry and exit of each of the multiple of respective passengers includes sensing an altitude of the passenger conveyance.

A further embodiment of any of the embodiments of the present disclosure may include, generating a passenger manifest off board the self-contained data acquisition system.

A further embodiment of any of the embodiments of the present disclosure may include, wherein sensing the position of the passenger conveyance upon entry and exit of each of the multiple of respective passengers includes sensing an elevator car position indicator.

The foregoing features and elements may be combined in various combinations without exclusivity, unless expressly indicated otherwise. These features and elements as well as the operation thereof will become more apparent in light of the following description and the accompanying drawings. It should be appreciated, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
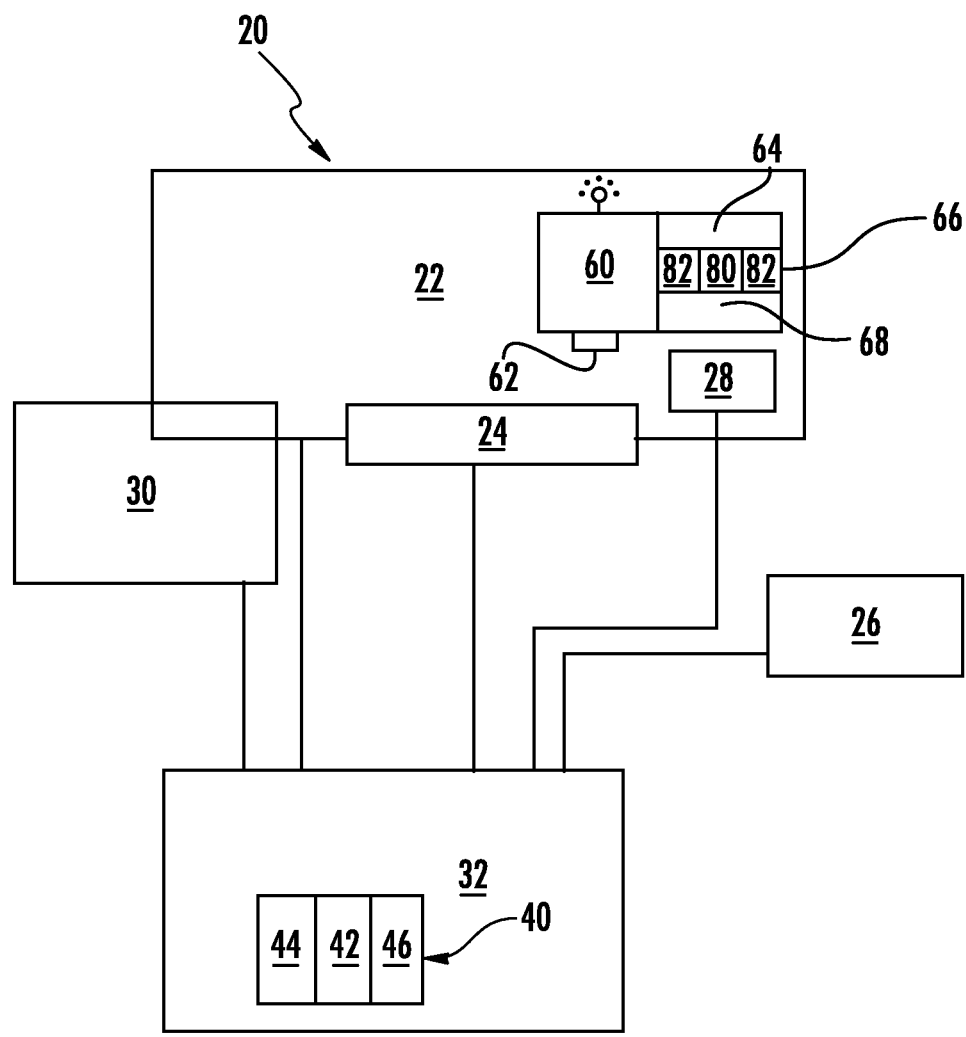
FIG. 1 is a schematic view of a passenger conveyance according to one disclosed non-limiting embodiment.

FIG. 1 schematically illustrates a passenger conveyance system 20 such as an elevator system. The system 20 can include an elevator car 22, an elevator door 24, a lobby call 26, a car-operating panel (COP) 28, a sensor system 30, and a control system 32. It should be appreciated that although an elevator system is disclosed and illustrated as an example herein, other passenger conveyance systems such as mass transit vehicles, escalators, travellators, or even non-conveying areas such as lobbies and plazas will also benefit herefrom. It should be further appreciated that although particular systems are separately defined, each or any of the systems can include otherwise combined or separated via hardware and/or software.

The overall amount of travel time a passenger associates with elevator performance can include three time intervals. A first time interval can be the amount of time a passenger waits in a lobby for an elevator to arrive, hereafter the "wait time", typically measured from the time a car is called, e.g. via pressing a hall call button. A second time interval can be the "door dwell time" or the amount of time the elevator doors are open, allowing passengers to enter or leave the elevator. A third time interval can be the "ride time" or amount of time a passenger spends in the elevator. The ride time can also include a stop on an intermediate floor to allow passengers to enter and/or exit the elevator which can add to the ride time by at least the door dwell time during the stop.

Various elevator systems can utilize a passenger initiated input to signal the need for elevator service. For example, input from the lobby call 26 may include a push button, e.g., up, down, or desired destination, to request elevator service. The passenger initiated input (e.g., via a call button) may notify the control system 32 of the presence of a passenger awaiting elevator service. In response, the control system 32 may dispatch the elevator car 22 to the appropriate floor. Optionally, once inside the elevator car 22, the passenger may push a button on the car-operating panel (COP) 28 designating the desired destination, direction, or the like, and then the control system 32 may dispatch the elevator car 22 to that destination.

The control system 32 can include a control module 40 with a processor 42, a memory 44, and a communications interface 46. The control module 40 can include a portion of a central control, a stand-alone unit, or other system such as a cloud-based system. The processor 42 can include any type of microprocessor having desired performance characteristics. The memory 44 may include any type of computer readable medium that stores the data and control processes disclosed herein. That is, the memory 44 is an example computer storage media that can have embodied thereon computer-useable instructions such as a process that, when executed, can perform a desired method. The interface 46 of the control module 40 can facilitate communication between the control module 40 and other systems.

Figure 2:
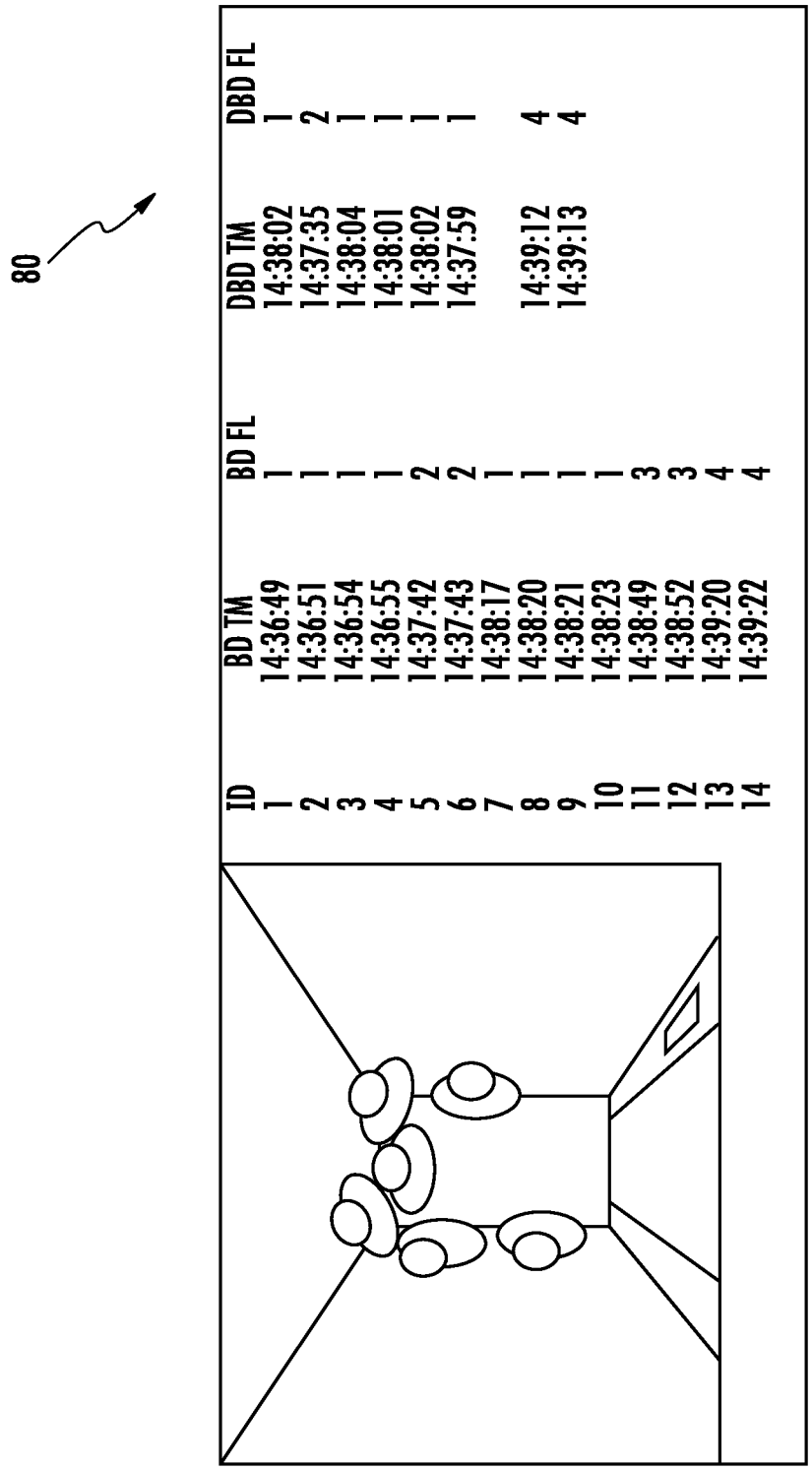
FIG. 2 is a screen shot of a passenger manifest with video data for elevator system according to another disclosed non-limiting embodiment.

A data acquisition system 60 can include a sensor module 62, a location sensor module 64, a processing module 66, and a power supply 68. The processing module 66 can be particular to the sensor modules 62, 64 to acquire and process the data therefrom. In one example, a depth sensor, through the processing module 66, is operable to obtain depth map data such as the entry and exit of each passenger from elevator car 22 (FIG. 2). That is, each passenger is particularly tracked into and out of the elevator car 22 such that accurate passenger flow data 80 may be gathered. Each elevator car 22 within a building can temporarily include a data acquisition system 60 that is time synchronized one to another such that passenger flow may be tracked throughout the entirety of the building.

It should be appreciated that the term "sensor," is used throughout this disclosure for any 1D, 2D, or 3D depth sensor, or combination thereof. Such a sensor can be operable in the electromagnetic or acoustic spectrum capable of producing a depth map (also known as a point cloud or occupancy grid) of the corresponding dimension(s). Various depth sensing sensor technologies and devices include, but are not limited to, a structured light measurement, phase shift measurement, time of flight measurement, stereo triangulation device, sheet of light triangulation device, light field cameras, coded aperture cameras, computational imaging techniques, simultaneous localization and mapping (SLAM), imaging radar, imaging sonar, scanning LIDAR, flash LIDAR, Passive Infrared (PIR) sensor, and small Focal Plane Array (FPA), or a combination comprising at least one of the foregoing. Different technologies can include active (transmitting and receiving a signal) or passive (only receiving a signal) and may operate in a band of the electromagnetic or acoustic spectrum such as visual, infrared, etc. The use of depth sensing can have specific advantages over conventional 2D imaging. The use of infrared sensing can have specific benefits over visible spectrum imaging such that alternatively, or additionally, the sensor can be an infrared sensor with one or more pixels of spatial resolution, e.g., a Passive Infrared (PIR) sensor or small IR Focal Plane Array (FPA).

Notably, there can be qualitative and quantitative differences between 2D imaging sensors, e.g., conventional security cameras, and 1D, 2D, or 3D depth sensing sensors to the extent that the depth-sensing provides numerous advantages. In 2D imaging, the reflected color (mixture of wavelengths) from the first object in each radial direction from the imager is captured. The 2D image, then, is the combined spectrum of the source illumination and the spectral reflectivity of objects in the scene. A 2D image can be interpreted by a person as a picture. In 1D, 2D, or 3D depth-sensing sensors, there is no color (spectral) information; rather, the distance (depth, range) to the first reflective object in a radial direction (1D) or directions (2D, 3D) from the sensor is captured. 1D, 2D, and 3D technologies may have inherent maximum detectable range limits and can be of relatively lower spatial resolution than typical 2D imagers. The use of 1D, 2D, or 3D depth sensing can advantageously provide improved operations compared to conventional 2D imaging in their relative immunity to ambient lighting problems, better separation of occluding objects, and better privacy protection. The use of infrared sensing has specific benefits over visible spectrum imaging. For example, a 2D image may not be converted into a depth map nor may a depth map be converted into a 2D image. (Although an artificial assignment of contiguous colors or grayscale to contiguous depths may allow a person to crudely interpret a depth map somewhat akin to how a person sees a 2D image, it is not an image in the conventional sense.) This inability to convert a depth map into an image might seem a deficiency, but it can be advantageous in certain analytics applications disclosed herein.

The location sensor module 64 may include one or more sensors to track the data acquisition system 60 in a self contained manner. That is, the location sensor module 64 may include one or more of, for example, an altimeter, a GPS sensor, an accelerometer, a barometer, and/or other sensor or sensors that identify the location of the data acquisition system 60. The location sensor module 64 and the power supply 68, such as a battery, permits the data acquisition system 60 to be self-contained such that the data acquisition system 60 may be removably mounted into the elevator 22.

Alternatively, the data acquisition system 60 may be a more permanent installation and be wired into the control system 32 to receive wire and facilitate control of various elevator features. In one example, the data acquisition system 60 may identify an approaching passenger and extend the time the elevator doors are held open to permit the approaching passenger to enter the elevator 22.

The processing module 66 can include a processor 80, a memory 82, and an interface 86. The processor 80 can include any type of microprocessor having desired performance characteristics. The memory 82 may include any type of computer readable medium that stores the data and control processes disclosed herein. That is, the memory 82 is an example computer storage media that can have embodied thereon computer-useable instructions such as a process that, when executed, can perform a desired method. The interface 86 of the can facilitate communication with other systems and/or modules.

The processing module 66 may utilize various 3D detection and tracking processes such as background subtraction, frame differencing, and/or spurious data rejection that can make the system more resistant to spurious data and facilitate localized tracking of each passenger. Such spurious data can be inherent to depth sensing and may vary with the particular technology employed. For active techniques, where a particular signal is emitted and subsequently detected to determine depth (e.g., structured light, time of flight, LIDAR, and the like) highly reflective surfaces may produce spurious depth data, e.g., not the depth of the reflective surface itself, but of a diffuse reflective surface at a depth that is the depth to the reflective surface plus the depth from the reflective surface to some diffusely reflective surface. Highly diffuse surfaces may not reflect a sufficient amount of the transmitted signal to determine depth that may result in spurious gaps in the depth map. Even further, variations in ambient lighting, interference with other active depth sensors or inaccuracies in the signal processing may result in spurious data.

Figure 3:
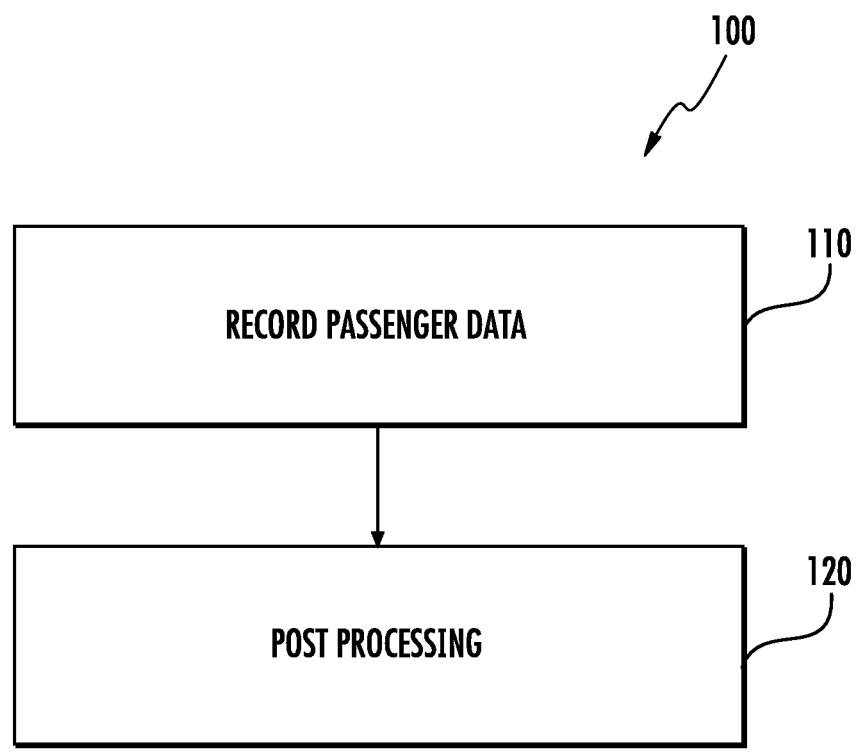
FIG. 3 is a block diagram of an algorithm for an elevator system according to another disclosed non-limiting embodiment.
Figures 4, 5:
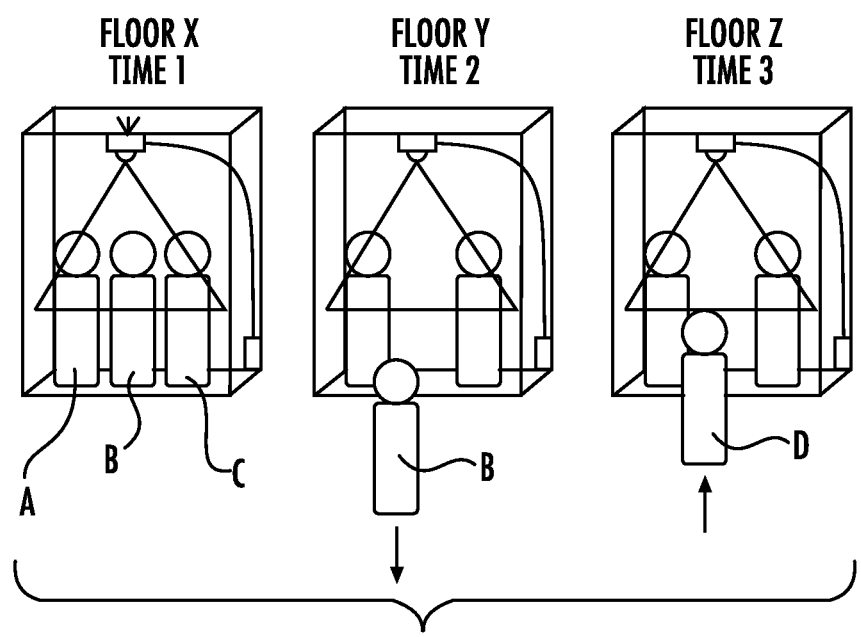
FIG. 4 is a block diagram illustrating operation of the algorithm for an elevator system according to another disclosed non-limiting embodiment.
FIG. 5 is a schematic view of real-time or post processed data for the algorithm according to another disclosed non-limiting embodiment.

With reference to FIG. 3, one disclosed non-limiting embodiment of a passenger tracking method 100 initially includes recordation of passenger data and other parameters to include, but not be limited to, current floor, elevator car motion, elevator state, door state, time, and other parameters by each data acquisition system 60 (step 110; FIG. 4). The parameters are derived from the sensor modules, 62, 64, independent of the elevator control system and may be stored therein.

Each passenger may be recognized and tracked from floor to floor by, for example, by something they know, e.g., a password, something they have, e.g., a token or ID card, and/or by something they are, e.g., a unique biometric. In one biometric example, face recognition is both relatively inexpensive and well developed. The biometric may be as simple as a person, detected by the sensing, is subject to image segmentation with a resolution that can distinguish and track individuals without actually recognizing identity.

The parameters and passenger video are stored on board the data acquisition system 60 and are determined without communication with the elevator control system 32. In one example, the data acquisition system 60 may view the COP 28 to record the floor entries as each passenger presses the button for the desired floor.

Next, the data collected by the data acquisition system 60 can then be post-processed to extract a list of passenger manifests (step 120; FIG. 5). The passenger manifests may, for example, include:

Passenger 1: 5/11/2015, 3:30 Floor 1 to 5/11/2015, 3:31 Floor 5;

. . . ; and

Passenger 2: 5/11/2015, 3:30 Floor 1 to 5/11/2015, 3:32 Floor 6.

Alternatively, the passenger manifests may be processed in real time by each data acquisition system 60 for later retrieval.

The passenger manifests are thereby utilized in post processing to capture the volume and destination of people moving through a building as the passenger list is used to extract various metrics to increase the efficiency of dispatching, etc.

The self-contained data acquisition system facilitates an automated process to determine a traffic flow to reduce time and cost which increases the number of captures. The data acquisition system 60 being an autonomous device permits data to be captured over a longer period of time than human fatigue limits would allow to improve analysis and thereby auto-tune passenger dispatching based on people flow The elements disclosed and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure.

It should be appreciated that relative positional terms such as "forward," "aft," "upper," "lower," "above," "below,"

"bottom", "top", and the like are with reference to the normal operational attitude and should not be considered otherwise limiting.

It should be appreciated that like reference numerals identify corresponding or similar elements throughout the several drawings. It should also be appreciated that although a particular component arrangement is disclosed in the illustrated embodiment, other arrangements will benefit herefrom.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

Although particular step sequences are shown, disclosed, and claimed, it should be appreciated that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically disclosed. For that reason the appended claims should be studied to determine true scope and content.

What is claimed is:

1. A self-contained data acquisition system removably mounted within an elevator car system, comprising:
    a depth-sensing sensor module for sensing data associated with an entry and exit of each of a multiple of passengers, the data obtained from a car operating panel and an elevator door position from within the car within which the self-contained data acquisition system is mounted, the depth-sensing sensor module operable to sense a button selection as each passenger presses the button for a desired floor;
    a location sensor module for sensing a position of the elevator car upon entry and exit of each of the multiple of passengers;
    a processing module in communication with the sensor module and the location sensor module, the processing module operable to use the sensed data from the sensor module and the location sensor module to generate passenger data determined on board the self-contained data acquisition system without communication with an elevator control system, wherein the passenger data comprises each passenger being tracked into and out of the elevator car and a floor of the elevator car;
    a memory operable to locally store the passenger data within the self-contained data acquisition system, the memory operable to locally store a passenger manifest generated by the processing module from the passenger data to generate a passenger manifest by post-processing the passenger data to extract a list of passenger manifests to capture a volume and a destination of people moving through a building via the elevator car system; and
    a power supply to power the processing module, the sensor module, and the location sensor module such that the data acquisition system is self-contained.

2. The system as recited in claim 1, wherein the passenger data includes a time at each floor at which an exit or entrance occurs.

3. The system as recited in claim 1, wherein the sensor module includes a video sensor.

4. The system as recited in claim 1, wherein the data acquisition system is time synched with a second data acquisition system.

5. A method of passenger traffic analysis for an elevator car system with a self-contained data acquisition system removably mounted into the elevator car, the method comprising:
    sensing data associated with an entry and exit of each of a multiple of passengers to the elevator car from within the elevator car within which a self-contained data acquisition system is mounted, wherein sensing data associated with the entry and exit of each of a multiple of passengers to the elevator car includes depth sensing;
    sensing data associated with a position of the elevator car upon entry and exit of each of the multiple of respective passengers by the self-contained data acquisition system, wherein sensing the position of the elevator car upon entry and exit of each of the multiple of respective passengers includes using depth sensing to sense a button selection on a car operating panel by the self-contained data acquisition system;
    using the data from the sensor module and the location sensor module to generate passenger data stored locally by the self-contained data acquisition system and determined without communication with an elevator control system, wherein the passenger data comprises each passenger being tracked into and out of the elevator car and a floor of the elevator car; and
    generating a passenger manifest off board the self-contained data acquisition system by post-processing the passenger data to extract a list of passenger manifests to capture the volume and destination of people moving through a building.

6. The method as recited in claim 5, wherein sensing data associated with an entry and exit of each of a multiple of passengers to the elevator car includes video tracking.

7. The method as recited in claim 5, wherein sensing the position of the elevator car upon entry and exit of each of the multiple of respective passengers includes sensing an altitude of the passenger conveyance.

8. The method as recited in claim 5, wherein sensing the position of the elevator car upon entry and exit of each of the multiple of respective passengers includes sensing an elevator car position indicator.

* * * * *